J. W. IVEY.
SAFETY STIRRUP.
APPLICATION FILED MAY 8, 1908.
908,265.
Patented Dec. 29, 1908.
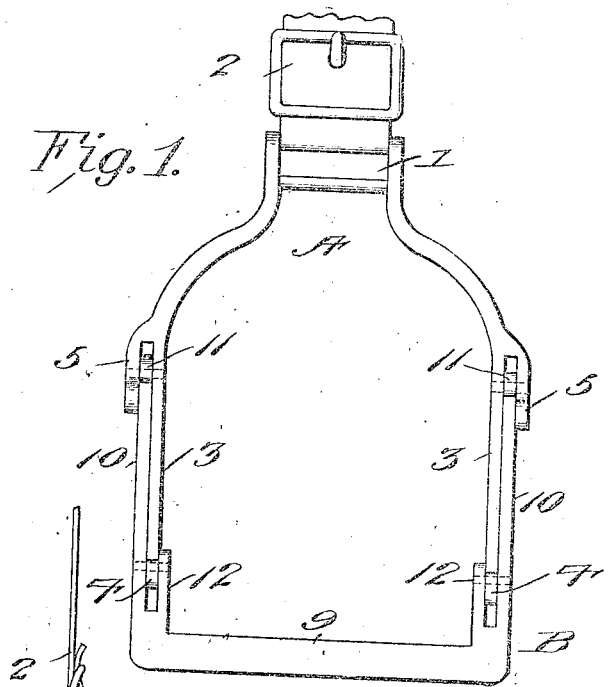
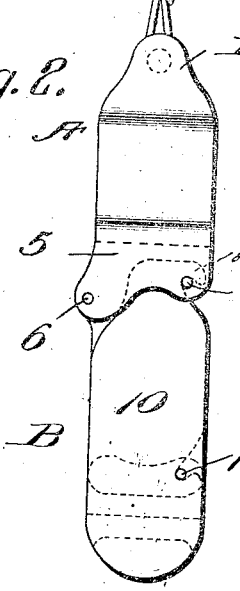
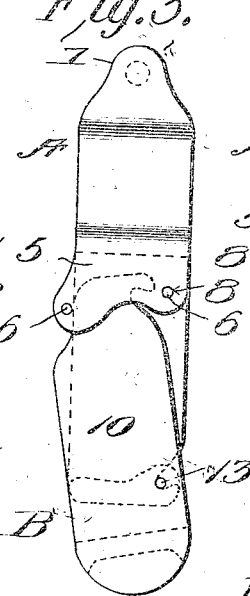
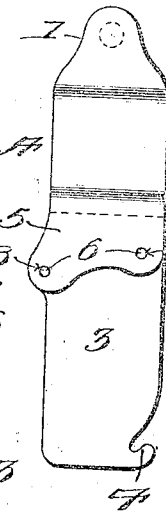
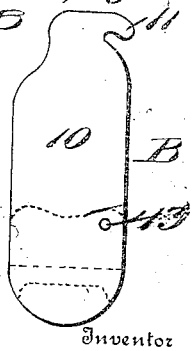
Witnesses
C. E. Smith
Inventor
John Wesley Ivey,
By Victor J. Evans
Attorney

UNITED STATES PATENT OFFICE.

JOHN WESLEY IVEY, OF BOONEVILLE, ARKANSAS.

SAFETY-STIRRUP.

No. 908,865.

Specification of Letters Patent.

Patented Dec. 29, 1908.

Application filed May 8, 1908. Serial No. 431,713.

*To all whom it may concern:*

Be it known that I, JOHN WESLEY IVEY, a citizen of the United States, residing at Booneville, in the county of Logan and State of Arkansas, have invented new and useful Improvements in Safety-Stirrups, of which the following is a specification.

This invention relates to stirrups, and particularly that class known as safety stirrups, and the object of the invention is to provide a safety stirrup of simple and durable construction, the parts of which are so arranged as to securely support the weight of a rider when in normal position upon his mount, and to become readily disengaged and separated should the rider fall or be thrown from the horse.

With these objects in view the invention resides in the novel construction of safety stirrups hereinafter fully described and claimed.

In the drawing, Figure 1 is a front elevation of my improved safety stirrup. Fig. 2 is a side elevation of the same. Fig. 3 is a similar view showing the parts in the act of separation. Fig. 4 is a side elevation of the upper or bail member of the stirrup, and Fig. 5 is a similar view of the lower or tread member of the stirrup.

My improved safety stirrup is constructed of two separate sections comprising an upper or bail member A and a lower or tread member B.

As shown in the drawing the upper member 1 is constructed in a substantially bow or arch shape comprising a loop 1, adapted for the reception of the saddle strap 2, and the depending arms 3. The free extremity of the arms 3 are each provided upon one of their edges with a lip 4, and the arms 3 are also provided with the ears 5 suitably spaced from the body portion of the arms and provided with perforations arranged near each edge of the extremity of the ears and at a slight inclination from each other. These perforations 6 are adapted for the reception of pins 8 which are also secured upon the arms 3 by suitable perforations provided therein for the reception of the pins.

The lower or tread member of the stirrup comprises a horizontal tread portion 9 having the upwardly extending side portions 10. The upper free ends of the side portions 10 are slightly reduced and provided upon one of its edges with a hook 11 and a rounded edge portion directly opposite the hook. The tread B is also provided with a pair of ears 12 extending upwardly in a plane with and suitably spaced away from the side portions of this member. The ears 12 and the sides 10 of the tread member are provided near one of their edges with suitable perforations adapted for the reception of a pin 13, the purpose of which will now be explained.

In assembling the sections of my improved safety stirrup the hooks 11 of the tread member are inserted within the opening formed between the ears 5 and the arms 3 of the bail member between the pins 8, and the hook adapted to engage the upper pin, while the lip 4 of the bail member is engaged between the ears 12 and the body 10 of the tread member and the lip adapted to contact with the pin 13 of the tread member. With this construction it will be observed that the two sections of the stirrup are securely engaged upon each other and that accidental displacement of the members is entirely obviated.

In practice the rider places his foot within the tread member 9 of the stirrup, the bail resting above his instep, should the rider fall or be thrown from his mount the fore part of his foot will contact with the bail A and cause the tread member 9 to revolve upon the pin 13 and to force the rounded portions of the sides 10 opposite the hook 11 into contact with the lowermost pin 6, the hook 11 being disengaged from its connection with the opposite pin 6 during this operation. Further pressure upon the tread 9 forces the pin 13 out of engagement with the lip 4, and the two members are separated, thus allowing the rider to fall free and be prevented from being dragged by the horse.

Changes in the precise embodiment of the invention illustrated and described may be made within the scope of the following claims without departing from the spirit or sacrificing any of its advantages.

Having thus fully described the invention what is claimed as new is:

1. A stirrup comprising an upper member having pintles and a lip, a lower member having a hook engaging the pintles and a pin engaging the lip of the upper member, the members being adapted for separation from each other upon rotation of the lower member.

2. A stirrup comprising an upper and lower member, ears upon the upper member and pins within said ears, and lips upon the free extremity of the said members, the lower member comprising a tread having arms provided with hooks, ears upon the lower member and a pin within said ears, the hook of the lower member adapted to engage one of the pins of the upper member, the lip of the upper member adapted to engage the pin within the ears of the lower member, and the members adapted to be separated from each other upon the rotation of the lower member.

In testimony whereof I affix my signature in presence of two witnesses.

JOHN WESLEY IVEY.

Witnesses:
AUSTIN R. HEDERICK,
J. V. IRES.